United States Patent
Rasanen et al.

(10) Patent No.: US 11,432,121 B2
(45) Date of Patent: Aug. 30, 2022

(54) SERVICE FUNCTION CHAIN INTERWORKING

(71) Applicant: NOKIA SOLUTIONS AND NETWORKS OY, Espoo (FI)

(72) Inventors: John Juha Antero Rasanen, Espoo (FI); Mikko Jyrki Olavi Kanerva, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 5 days.

(21) Appl. No.: 15/512,258

(22) PCT Filed: Sep. 19, 2014

(86) PCT No.: PCT/EP2014/069960
§ 371 (c)(1),
(2) Date: Mar. 17, 2017

(87) PCT Pub. No.: WO2016/041602
PCT Pub. Date: Mar. 24, 2016

(65) Prior Publication Data
US 2017/0257753 A1 Sep. 7, 2017

(51) Int. Cl.
*H04W 4/50* (2018.01)
*H04W 8/12* (2009.01)
*H04W 8/18* (2009.01)

(52) U.S. Cl.
CPC ............. *H04W 4/50* (2018.02); *H04W 8/12* (2013.01); *H04W 8/18* (2013.01)

(58) Field of Classification Search
CPC ............ H04W 4/50; H04W 8/12; H04W 8/18
See application file for complete search history.

(56) References Cited

U.S. PATENT DOCUMENTS

| | | | |
|---|---|---|---|
| 2005/0239458 A1 | 10/2005 | Hurtta | |
| 2011/0299548 A1* | 12/2011 | Chen | G06Q 30/04 370/401 |
| 2013/0337769 A1* | 12/2013 | Bhatia | H04M 15/81 455/406 |
| 2015/0036550 A1* | 2/2015 | Wu | H04W 8/02 370/259 |

(Continued)

OTHER PUBLICATIONS

3GPP TR 22.808 3rd Generation Partnership Project; Technical Specification Group Services and System Aspects; Study on Flexible Mobile Service Steering (FMSS) (Release 13) V1.1.0 Aug. 2014.*

(Continued)

*Primary Examiner* — Joseph E Dean, Jr.
(74) *Attorney, Agent, or Firm* — Squire Patton Boggs (US) LLP

(57) ABSTRACT

There are provided measures for service function chain interworking. Such measures exemplarily comprise recognizing, that said terminal is roaming in said visited network, detecting, that said visited network supports utilizing service functions of said service chaining, and applying, at a control function entity controlling said service function chaining, a service function of said service function chaining to a service data flow of said terminal, said service function being determined based on information on said roaming of said terminal in said visited network.

21 Claims, 10 Drawing Sheets

(56) References Cited

U.S. PATENT DOCUMENTS

2015/0181441 A1* 6/2015 Bindrim .................. H04L 67/28
370/328

OTHER PUBLICATIONS

International Search Report and Written Opinion dated May 28, 2015 corresponding to International Patent Application No. PCT/EP2014/069960.
Huawei Technologies et al.: "Consolidation of Requirements for FMSS," 3GPP Draft; S1-143540 FMSS Consolidation of Requirements, 3GPP TSG-SA WG1 Meeting #67, Sophia Antipolis, France, Aug. 25, 2014, XP050834955.
3GPP TR 22.808 V2.0.0 (Sep. 2014), Technical Report, 3rd Generation Partnership Project; Technical Specification Group Services and System Aspects; Study on Flexible Mobile Service Steering (FMSS) (Release 13), Sep. 9, 2014, XP050802076.
P. Quinn et al., "Network Service Header; draft-quinn-nsh-01.txt" Network Working Group, Jul. 12, 2013, 18 pages.
P. Quinn et al., "Service Function Chaining Problem Statement, draft-quinn-sfc-problem-statement-02.txt" Network Working Group, Dec. 9, 2013, 18 pages.
Report of TSG SA meeting #66, Version 1.0.0, Maui, Hawaii, USA, Dec. 10-12, 2014, pp. 1-100.
Communication pursuant to Article 94(3) EPC dated Jan. 22, 2020 corresponding to European Patent Application No. 14771297.0.
European Office Action issued in corresponding European Patent Application No. 14 771 297.0-1218 dated Dec. 11, 2020.
European Office Action issued in corresponding European Patent Application No. 14 771 297.0-1218 dated May 11, 2022.

* cited by examiner

SERVICE FUNCTION CHAIN INTERWORKING

FIELD

The present invention relates to service function chain interworking. More specifically, the present invention exemplarily relates to measures (including methods, apparatuses and computer program products) for realizing service function chain interworking.

BACKGROUND

The present specification generally relates to service function chaining in a $3^{rd}$ Generation Partnership Project (3GPP) environment. Recently, standardization work on service function chaining has been going on with the work item flexible mobile service steering (FMSS). Here, service requirements for new features to be used as a basis for the later stages are defined as normative specifications.

Service function chaining in a 3GPP environment is assumed to be standardized and/or implemented at the Gi/SGi reference point so that packet data network gateway (PDN-GW, P-GW) can be part of the service function chain. P-GW may contain some service functions and/or the packet classifier function(s) that classify internet protocol (IP) packets for routing within the service function chain.

FIG. 7 shows an example of possible functionalities in a service function chain in conjunction with a 3GPP network divided into a control plane (CP) and a user plane (UP). In FIG. 7, reference sign 71 denotes a user equipment (UE), reference sign 72 denotes a radio network, references sign 73 denotes a serving gateway (S-GW), reference sign 74 denotes a P-GW, reference sign 75 denotes a service chain router, reference sign 76 denotes an edge router, reference sign 77 denotes a controller, reference sign 78 denotes a deep packet inspection (DPI) function, reference sign 79 denotes a video optimizer function, reference sign 710 denotes a cache function, reference sign 711 denotes a network address translation (NAT) function, reference sign 712 denotes a firewall function, and reference sign 713 denotes any other application(s).

It is noted that the service functions and routers are functionalities that may be integrated e.g. in the P-GW or may be standalone units.

In a roaming home-routed case the P-GW, with the associated service function chain, resides in the home network. The visited network, wherein the user/UE/terminal is roaming, is connected to the home network P-GW via a visited network S-GW. Accordingly, even if there is a service function chain in the visited network, the chain in the visited network is not available for the sessions/service data flows (SDF) of roaming home-routed users.

In the most general case, with the General Packet Radio Service (GPRS) tunneling protocol (GTP) between S-GW and P-GW, there is not even a policy and charging rules function (PCRF) for such sessions/SDFs in the visited network to support policy control and enforcement in the visited network and policy exchange between the visited network and the home network.

Hence, the problem arises that even though the access network resources of the visited network are used, the visited network has no control over the service function chaining (e.g.) to optimize the usage of its resources.

The possible use of the service function chain in the home network is controlled by the home network. But in a roaming home-routed case the home network is not aware of the prevailing situation/status in the visited access network. Accordingly, even though user's sessions use the access network resources of the visited network, the home network supporting the service function chaining for the sessions/SDFs of roaming home-routed users/UEs has no status information to make optimal decisions on the usage of the services offered by the service function chain.

Hence, the further problem arises that any conditions (e.g. overload) or events (e.g. detected traffic that activates given policy control) in the access network, that may cause routing of an SDF via a service function chain in a non-roaming case, stay unnoticed for roaming home-routed users/UEs.

Hence, there is a need to provide for service function chain interworking.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a control method, in a home network of a terminal roamed in a visited network connected to said home network, of controlling service function chaining of said home network, the method comprising recognizing, that said terminal is roaming in said visited network, detecting, that said visited network supports utilizing service functions of said service chaining, and applying, at a control function entity controlling said service function chaining, a service function of said service function chaining to a service data flow of said terminal, said service function being determined based on information on said roaming of said terminal in said visited network.

According to an exemplary aspect of the present invention, there is provided a utilizing method, in a visited network roaming a terminal of a home network connected to said visited network, of utilizing for said terminal a service function of service function chaining of said home network, the method comprising receiving, from said home network, information related to said service function chaining, and transmitting, to said home network, information related to an intended utilization of said service function for a service data flow of said terminal, said service function being determined based on information on said roaming of said terminal in said visited network.

According to an exemplary aspect of the present invention, there is provided a control system, in a home network of a terminal roamed in a visited network connected to said home network, for controlling service function chaining of said home network, the control system comprising a control function entity configured to controlling said service function chaining, a recognizing device connected to said control function entity and configured to recognize, that said terminal is roaming in said visited network, and a detecting device connected to said control function entity and configured to detect, that said visited network supports utilizing service functions of said service chaining, wherein said control function entity comprises a applying device configured to apply a service function of said service function chaining to a service data flow of said terminal, said service function being determined based on information on said roaming of said terminal in said visited network.

According to an exemplary aspect of the present invention, there is provided a utilizing system, in a visited network roaming a terminal of a home network connected to said visited network, for utilizing for said terminal a service function of service function chaining of said home network, the utilizing system comprising a receiving device configured to receive, from said home network, information related to said service function chaining, and a transmitting device connected to said receiving device and configured to transmit, to said home network, information related to an intended utilization of said service function for a service data flow of said terminal, said service function being determined based on information on said roaming of said terminal in said visited network.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient service function chain interworking to thereby solve at least part of the problems and drawbacks identified in relation to the prior art.

In particular, according to exemplary embodiments of the present invention, service functions not supported by a network, or temporarily not available (e.g. local policy, congestion, overload), can anyway be applied to connection to/from that network by using the service function offered by an external/far end network. Further, according to exemplary embodiments of the present invention, service functions needed/wanted by the access network in downlink direction can be applied as near to the origin of the SDF as possible, so the manipulation/optimization benefit of the SDFs (e.g. video optimization) applies to the connection including possible intermediate transmission legs.

By way of exemplary embodiments of the present invention, there is provided service function chain interworking. More specifically, by way of exemplary embodiments of the present invention, there are provided measures and mechanisms for realizing service function chain interworking.

Thus, improvement is achieved by methods, apparatuses and computer program products enabling/realizing service function chain interworking.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refer to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a network deployment utilizing 3GPP service function chaining is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) service function chain interworking.

Figure 1:
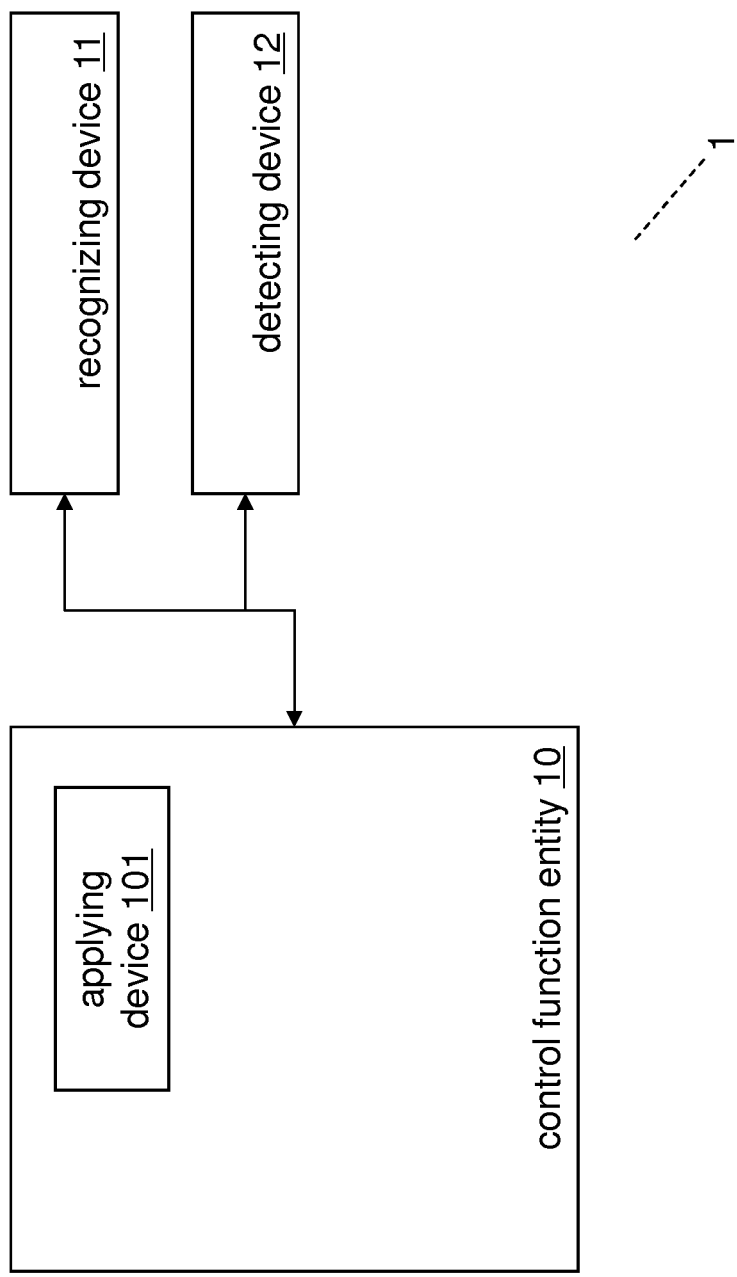
FIG. 1 is a block diagram illustrating a system according to exemplary embodiments of the present invention.

FIG. 1 is a block diagram illustrating a control system 1 according to exemplary embodiments of the present invention which is arranged in a home network of a terminal roaming in a visited network connected to said home network, said control system 1 being arranged for controlling service function chaining of said home network.

The control system 1 may comprise a control function entity 10, a recognizing device 11 which is connected to said control function entity 10, and a detecting device 12 which is also connected to said control function entity 10. The control function entity 10 may comprise an applying device 101.

The control function entity 10 controls said service function chaining. The recognizing device 11 recognizes, that said terminal is roaming in said visited network. The detecting device 12 detects, that said visited network supports utilizing service functions of said service chaining. The applying device 101 applies a service function of said service function chaining to a service data flow of said terminal, said service function being determined based on information on said roaming of said terminal in said visited network.

Figure 5:
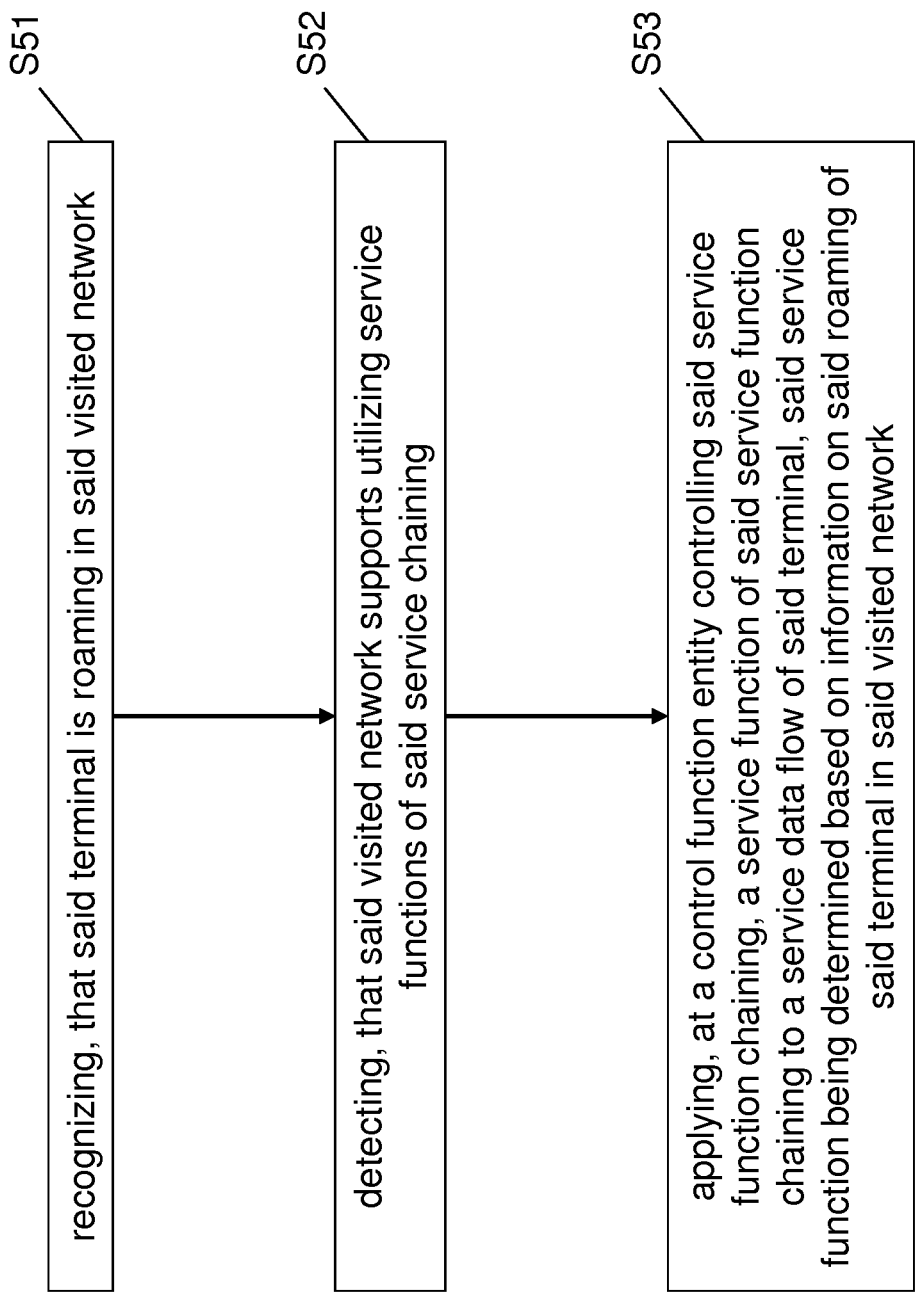
FIG. 5 is a schematic diagram of a procedure according to exemplary embodiments of the present invention.

FIG. 5 is a schematic diagram of a procedure according to exemplary embodiments of the present invention. The system according to FIG. 1 may perform the method of FIG. 5 but is not limited to this method. The method of FIG. 5 may be performed by the system of FIG. 1 but is not limited to being performed by this system.

As shown in FIG. 5, a procedure according to exemplary embodiments of the present invention comprises an operation of recognizing (S51), that said terminal is roaming in said visited network, an operation of detecting (S52), that said visited network supports utilizing service functions of said service chaining, and an operation of applying (S53), at a control function entity controlling said service function chaining, a service function of said service function chaining to a service data flow of said terminal, said service function being determined based on information on said roaming of said terminal in said visited network.

Figure 2:
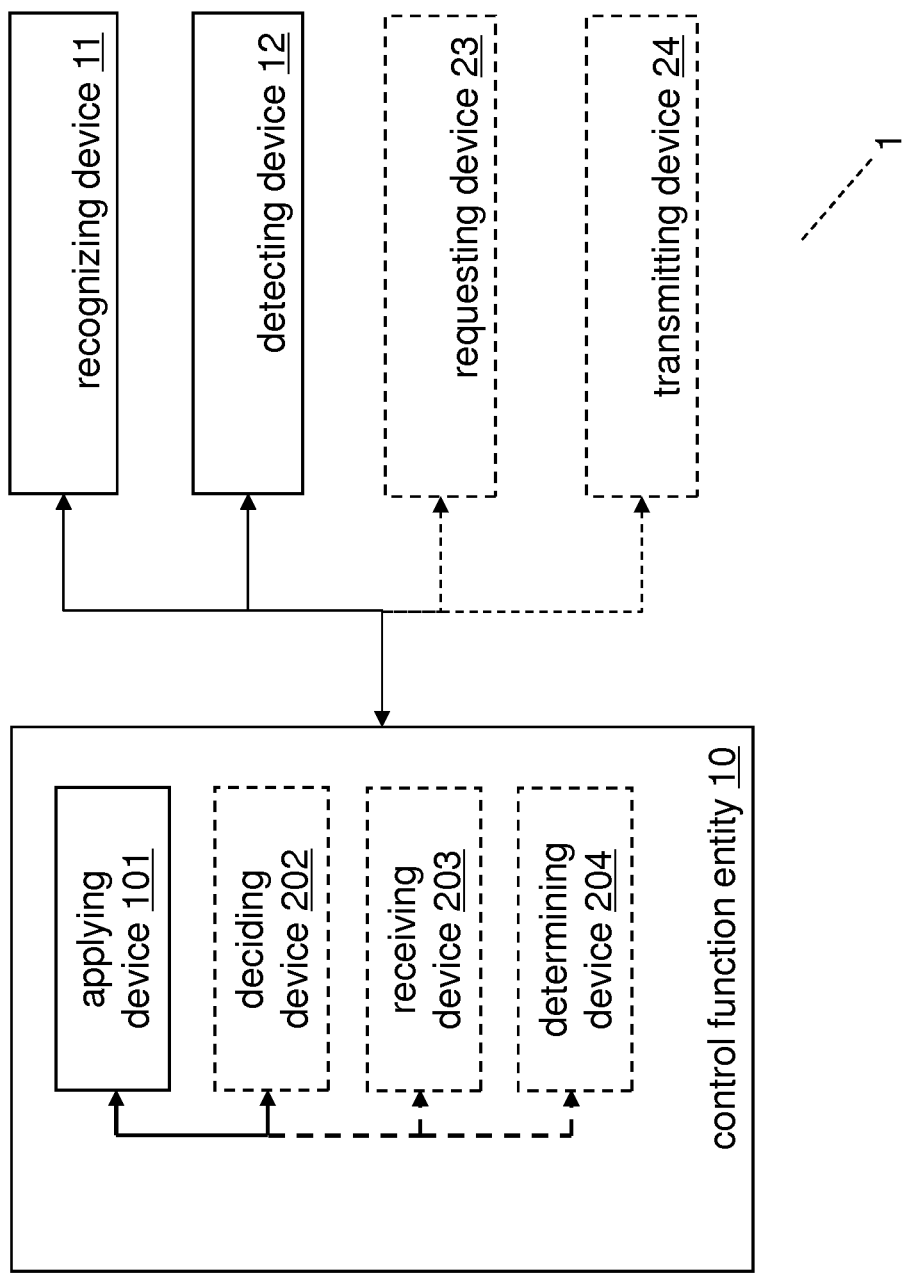
FIG. 2 is a block diagram illustrating a system according to exemplary embodiments of the present invention.

FIG. 2 is a block diagram illustrating the control system 1 according to exemplary embodiments of the present invention. In particular, FIG. 2 illustrates a variation of the system shown in FIG. 1. The system 1 according to FIG. 2 may thus further comprise a requesting device 23 and a transmitting device 24, while the control function entity 10 may further comprise a deciding device 202, a receiving device 203 and a determining device 204.

According to a variation of the procedure shown in FIG. 5, exemplary additional operations are given, which are inherently independent from each other as such. According to such variation, an exemplary method according to exemplary embodiments of the present invention may comprise an operation of deciding, based on a result of said recognizing and said detecting, that service function chaining information is to be requested for said service data flow from said control function entity, and an operation of requesting, for said service data flow, from said control function entity, said service function chaining information.

According to a further variation of the procedure shown in FIG. 5, exemplary additional operations are given, which are inherently independent from each other as such. According to such variation, an exemplary method according to exemplary embodiments of the present invention may comprise an operation of receiving, at said control function entity, said requesting for said service function chaining information for said service data flow, an operation of deciding, at said control function entity, a selection of service functions of said service function chaining to be advertised based on said service data flow, and an operation of transmitting, to said visited network, said selection of service functions of said service function chaining to be advertised.

According to a still further variation of the procedure shown in FIG. 5, exemplary additional operations are given, which are inherently independent from each other as such. According to such variation, an exemplary method according to exemplary embodiments of the present invention may comprise an operation of receiving, from said visited network, a request indicative of a demand of utilization of said service function for said service data flow, wherein said service function being determined on a visited network side.

According to a still further variation of the procedure shown in FIG. 5, exemplary additional operations are given, which are inherently independent from each other as such. According to such variation, an exemplary method according to exemplary embodiments of the present invention may comprise an operation of receiving, at said control function entity, said requesting for said service function chaining information for said service data flow, and an operation of transmitting, to said visited network, an indication that reception of said information on said roaming of said terminal in said visited network is accepted.

According to a still further variation of the procedure shown in FIG. 5, exemplary additional operations are given, which are inherently independent from each other as such. According to such variation, an exemplary method according to exemplary embodiments of the present invention may comprise an operation of receiving, from said visited network, said information on said roaming of said terminal in said visited network, and an operation of determining, at said control function entity, said service function based on said information on said roaming of said terminal in said visited network.

According to exemplary embodiments of the present invention, said information on said roaming of said terminal in said visited network is at least one of policy information for said terminal, network status information of said visited network, and status information of said terminal.

Here, it is noted that the information on said roaming of said terminal in said visited network is not limited to the above mentioned exemplary possibilities.

In fact, when roaming a terminal in a visited network, information on said roaming includes at least all information related to the involved entities, that is, information on terminal related aspects, information on network aspects of the visited network, and information on roaming related aspects like e.g. respective configurations or policies.

Figure 3:
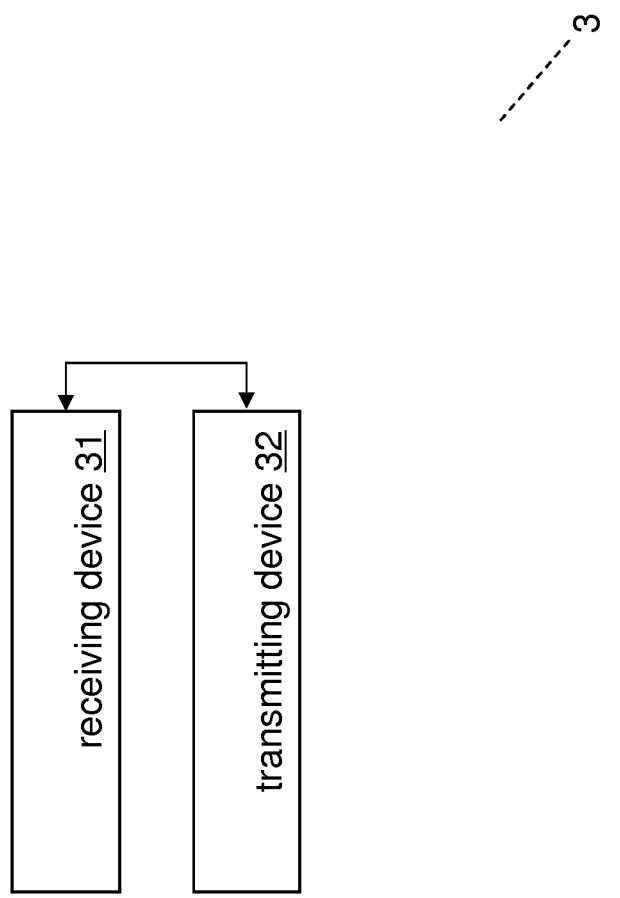
FIG. 3 is a block diagram illustrating a system according to exemplary embodiments of the present invention.

FIG. 3 is a block diagram illustrating a utilizing system 3 according to exemplary embodiments of the present invention which is arranged in a visited network roaming a terminal of a home network connected to said visited network, said system being arranged for utilizing for said terminal a service function of service function chaining of said home network.

The utilizing system 3 may comprise a receiving device 31 and a transmitting device 32 which is connected to said receiving device.

The receiving device 31 receives, from said home network, information related to said service function chaining. The transmitting device 32 transmits, to said home network, information related to an intended utilization of said service function for a service data flow of said terminal, said service function being determined based on information on said roaming of said terminal in said visited network.

Figure 6:
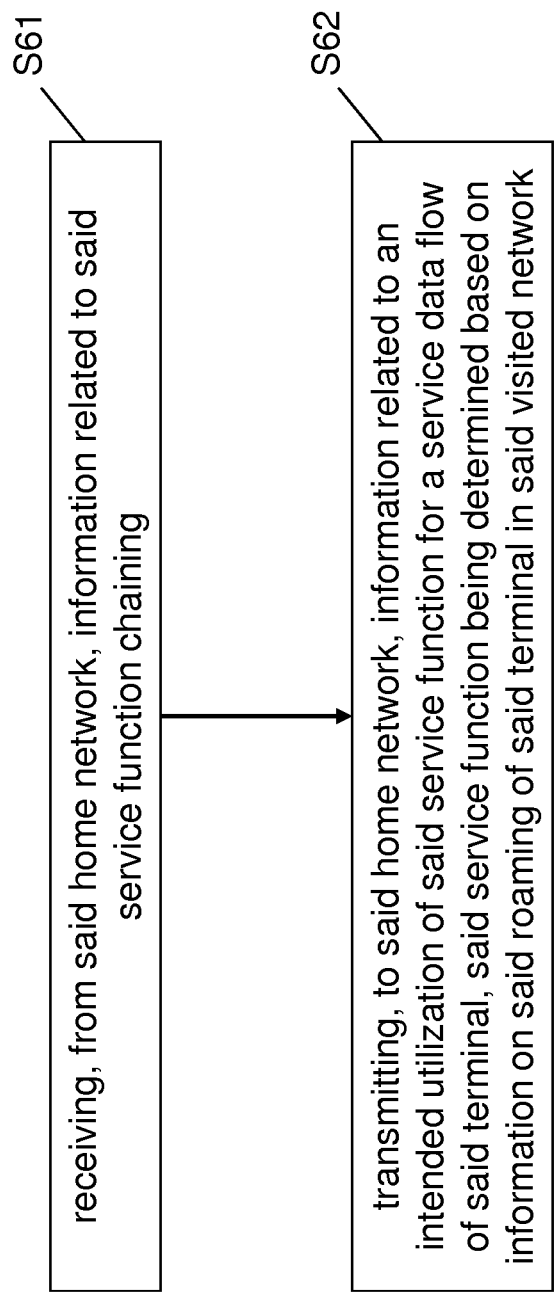
FIG. 6 is a schematic diagram of a procedure according to exemplary embodiments of the present invention.
Figure 7:
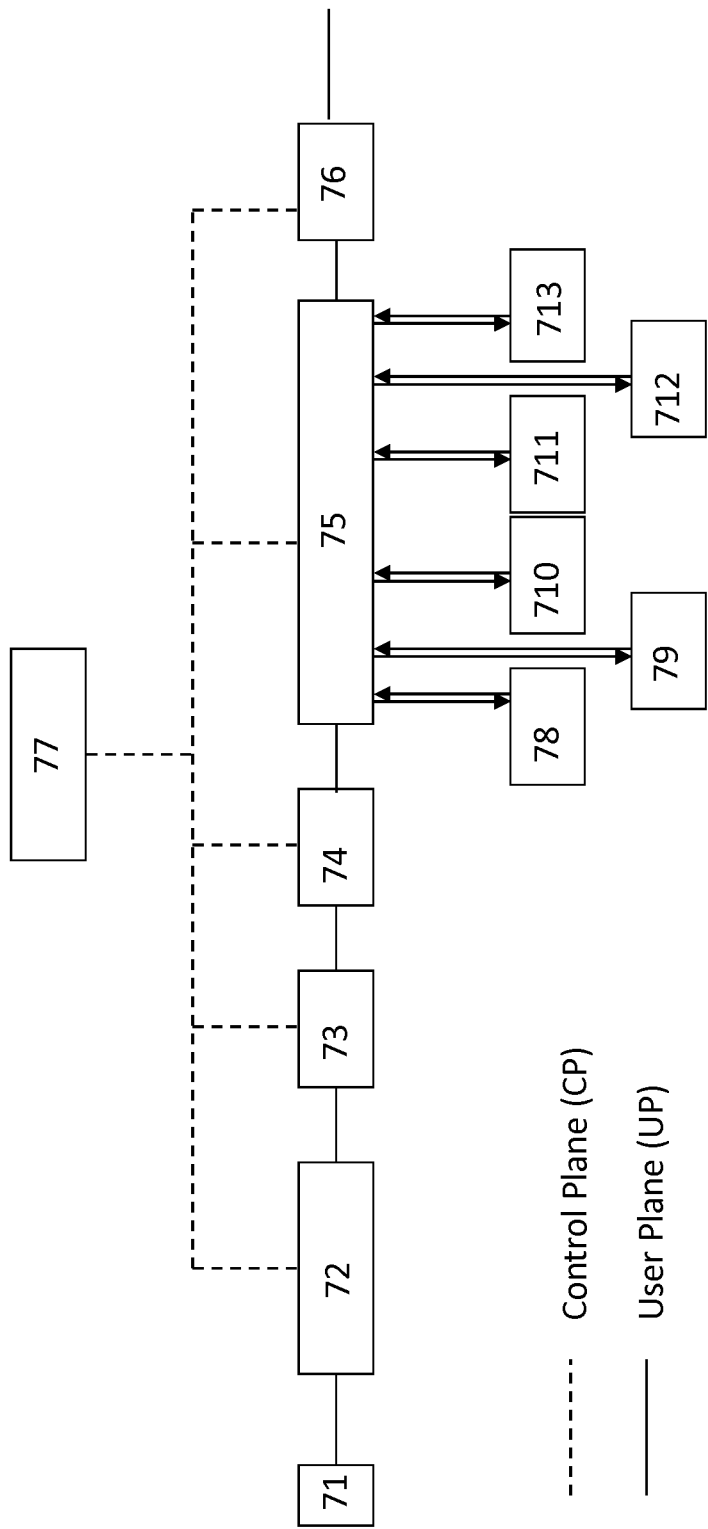
FIG. 7 shows a schematic diagram of an example of possible functionalities in a service function chain in conjunction with a 3GPP network.

FIG. 6 is a schematic diagram of a procedure according to exemplary embodiments of the present invention. The system according to FIG. 3 may perform the method of FIG. 6 but is not limited to this method. The method of FIG. 6 may be performed by the system of FIG. 3 but is not limited to being performed by this system.

As shown in FIG. 6, a procedure according to exemplary embodiments of the present invention comprises an operation of receiving (S61), from said home network, information related to said service function chaining, and an operation of transmitting (S62), to said home network, information related to an intended utilization of said service function for a service data flow of said terminal, said service function being determined based on information on said roaming of said terminal in said visited network.

Figure 4:
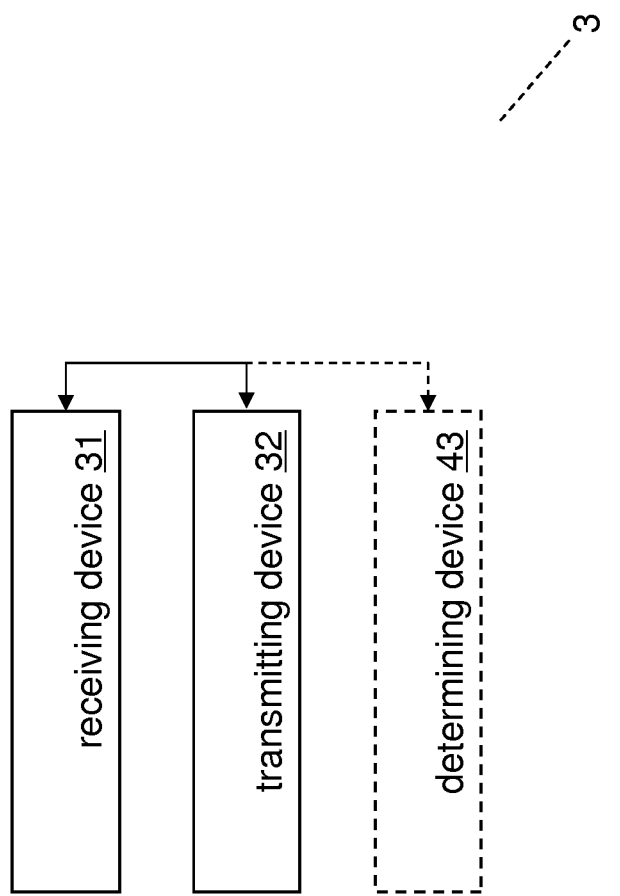
FIG. 4 is a block diagram illustrating a system according to exemplary embodiments of the present invention.

FIG. 4 is a block diagram illustrating the utilizing system 3 according to exemplary embodiments of the present invention. In particular, FIG. 4 illustrates a variation of the system shown in FIG. 3. The system 3 according to FIG. 4 may thus further comprise a determining device 43 connected to the receiving device 31 and the transmitting device 32.

According to a variation of the procedure shown in FIG. 6, exemplary additional operations are given, which are inherently independent from each other as such. According to such variation, an exemplary method according to exemplary embodiments of the present invention may comprise an operation of receiving, from said home network, a selection of service functions of said service function chaining, an operation of determining said service function out of said selection of service functions for said service data flow, and an operation of transmitting, to said home network, a request indicative of a demand of utilization of said service function for said service data flow.

According to a further variation of the procedure shown in FIG. 6, exemplary additional operations are given, which are inherently independent from each other as such. According to such variation, an exemplary method according to exemplary embodiments of the present invention may comprise an operation of receiving, from said home network, an indication that reception of said information on said roaming of said terminal in said visited network is accepted, and an operation of transmitting, to said home network, said information on said roaming of said terminal in said visited network, wherein said service function being determined on a home network side.

According to exemplary embodiments of the present invention, said information on said roaming of said terminal in said visited network is at least one of policy information for said terminal, network status information of said visited network, and status information of said terminal.

The exemplary embodiments outlined above are in the following described in more detail.

In an inter-network connection one or both of the networks according to the exemplary embodiments of the present invention may advertise its service chain functions currently available for the user session/SDFs, or may advertise that service function chain in general is available and can/will be applied as per the policy information and/or network and/or UE status information (status of roaming of the UE/terminal in the visited network) created and sent by the visited network.

The network receiving the advertisement may indicate which service function(s) it wants to be used for a given SDF.

Exemplary embodiments of the present invention are thus described in detail with the following two cases.

A first option according to exemplary embodiments of the present invention is a 3GPP roaming home-routed session, wherein the visited network receives an advertisement of available services from the home network and decides to request to use/apply (an) advertised service(s).

Figure 8:
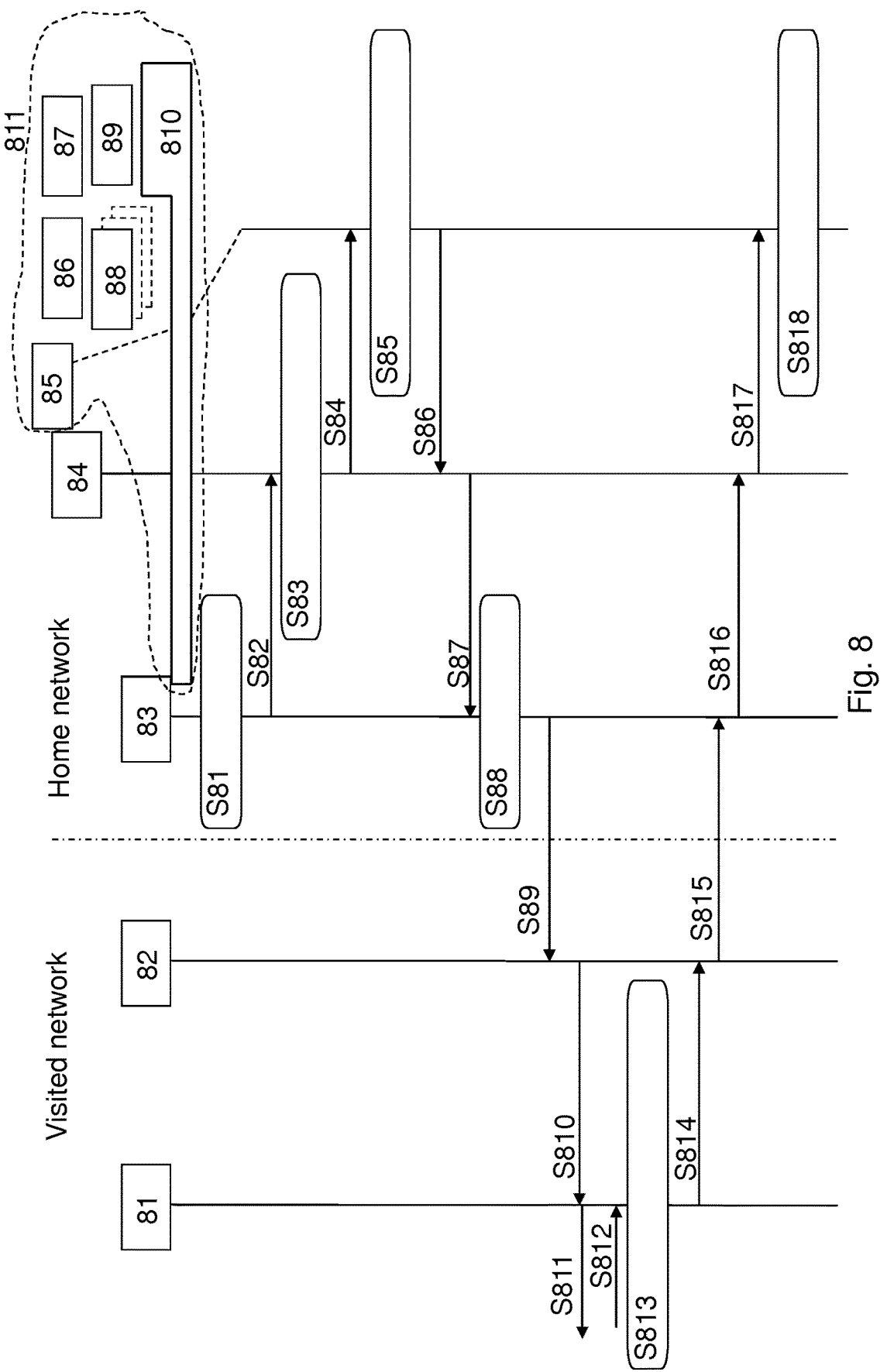
FIG. 8 shows a schematic diagram of an example of a system environment with signaling variants according to exemplary embodiments of the present invention.

FIG. 8 shows a schematic diagram of an example of a system environment with signaling variants according to exemplary embodiments of the present invention and in particular a 3GPP roaming home-routed session according to the first considered option.

It is noted that the service functions and routers are functionalities that may be integrated e.g. in the P-GW 83 or may be standalone units. It is also noted that the control function may be stand alone functionality or may be integrated with other functionalities, e.g. PCRF 84 or an OSS function. For example, if integrated with PCRF 84, some steps in the signalling diagram below are implemented internally.

In FIG. 8, reference sign 81 denotes a mobility management entity (MME), reference sign 82 denotes a S-GW, reference sign 83 denotes a P-GW, reference sign 84 denotes a PCRF, reference sign 811 denotes a service chain 811 comprising a control function 85 (e.g. a control function entity), a video optimizer function 86, a firewall function 87, a parental control function 89, a packet classifier function 810, and other service functions 88, respectively located in the visited network and the home network as illustrated in FIG. 8.

As can be seen in FIG. 8, in a step S81, P-GW 83 is triggered to establish or modify a bearer for an internet protocol connectivity access network (IP-CAN) session. The trigger may be e.g. a detected start of an application, i.e. the application detection and control (ADC) functions within the P-GW 83 detect an application. Alternatively, the trigger may be e.g. a UE originated resource modification request.

In a step S82, P-GW 83 sends a request for authorization and PCC rules to PCRF 84 comprising any parameters.

In a step S83, PCRF 84 recognizes that the user/UE is roaming in a network/domain that supports service chain advertising. Accordingly, PCRF 84 decides to request information about currently available service chain functions for the roaming subscriber/UE (terminal). The parameters in the request may include e.g. quality of service (QoS) parameters for a related SDF or SDFs.

In a step S84, PCRF 84 sends a request (including any parameters) prepared in step S83 to a control function 85 that maintains the status and availability of the service functions of the service function chain 811. This step may be internal, if the control function 85 is integrated with PCRF 84.

In a step S85, the control function 85 decides which service functions can be advertised as being available. The selection process may use e.g. the QoS parameters and possible other SDF related parameters as selection criteria.

In a step S86, the control function 85 sends a response which defines/identifies the available service functions, possible linked with SDFs, e.g. through filter information. The response may thus comprise service offer(s) and further parameters.

In a step S87, PCRF 84 defines related PCC Rules and sends the PCC Rules and the information about the available service functions to P-GW 83. This response may thus comprise service offer(s), PCC Rules and further parameters.

In a step S88, the P-GW 83 decides to establish or modify a bearer.

Subsequently, in a step S89, P-GW 83 sends the information about the available service functions in the bearer establishment/modification request message to S-GW 82. The request may thus include service offer(s) and further SDF parameters.

In a step 810, S-GW 82 sends the information about the available service functions in the bearer establishment/modification request message to MME 81. The request may thus include service offer(s) and further SDF parameters.

In a step S811, MME 81 sends a bearer establishment/modification request to the radio network. In a subsequent step S812, MME 81 gets a response from the radio network. The response may contain up-to-date status information about the radio network.

In a step S813, MME 81 checks the offer (i.e. the information about the available service functions received from P-GW 83 in step S89) against the visited network status and decides to request to use/apply (an) offered service(s).

In a following step S814, MME 81 sends a response to S-GW 82. The response may indicate/identify wanted/requested services of the home network service function chain, possibly linked with SDFs. In particular, the response may thus include wanted service(s) and further SDF parameters.

In step S815, S-GW 82 sends/forwards the response to P-GW 83. The response may thus include wanted service(s) and further SDF parameters.

In a step S816, the P-GW 83 sends a request to PCRF 84. The request may indicate/identify wanted/requested services of the home network service function chain, possibly linked with SDFs. The request may thus include wanted service(s) and further SDF parameters.

In step S817, the PCRF 84 sends a request to the control function 85. The request may indicate/identify wanted/requested services of the home network service function chain 811, possibly linked with SDFs. The request may thus include wanted service(s) and further SDF parameters. This step S817 may be internal, if the control function 85 is integrated with PCRF 84.

In a final step S818, the service chain control function 85 routes the relevant SDF(s) via wanted services/service functions of the service function chain 811.

A second option according to exemplary embodiments of the present invention is a 3GPP roaming home-routed session, wherein the visited network may receive from the home network either an advertisement of available services or just an indication that policy information and/or network and/or UE status information can be accepted so that the home network can choose the appropriate service.

Also this option is described using FIG. 8. It is noted that the sequence of the steps is similar to those described in relation to the first option, and merely the differences to the first option are described in the following.

Namely, according to the exemplary embodiments of this option of the present invention, step S85 may just comprise a decision as to whether to indicate that policy information and/or network and/or UE status information can be accepted (from the visited network for controlling the SDF routing in the service function chain 811). Alternatively, the issue has been agreed (i.e. successfully negotiated) between the operators and no indication is needed.

Further, the steps S86, S87, S89 and S810 (and possibly step S811) may just contain an indication that policy information and/or network and/or UE status information can be accepted (from the visited network for controlling the SDF routing in the service function chain 811) instead of the service offer(s). Alternatively, the issue has been agreed between the operators and no indication is needed, but the visited network may deduce e.g. by configuration based on the agreement that the information may be sent to the given network/domain.

Further, in step S813, MME 81 collects policy information and/or network and/or UE status information (i.e. information on roaming of terminal in visited network) to be sent to S-GW 82.

Furthermore, steps S814 to S817 contain policy information and/or network and/or UE status information instead of the wanted/requested service(s).

Accordingly, in step S818, the service chain control function 85 routes the relevant SDF(s) via services/service functions of the service function chain 811 using the policy information and/or network and/or UE status information received from the visited network at least as part of the criteria.

Figure 9:
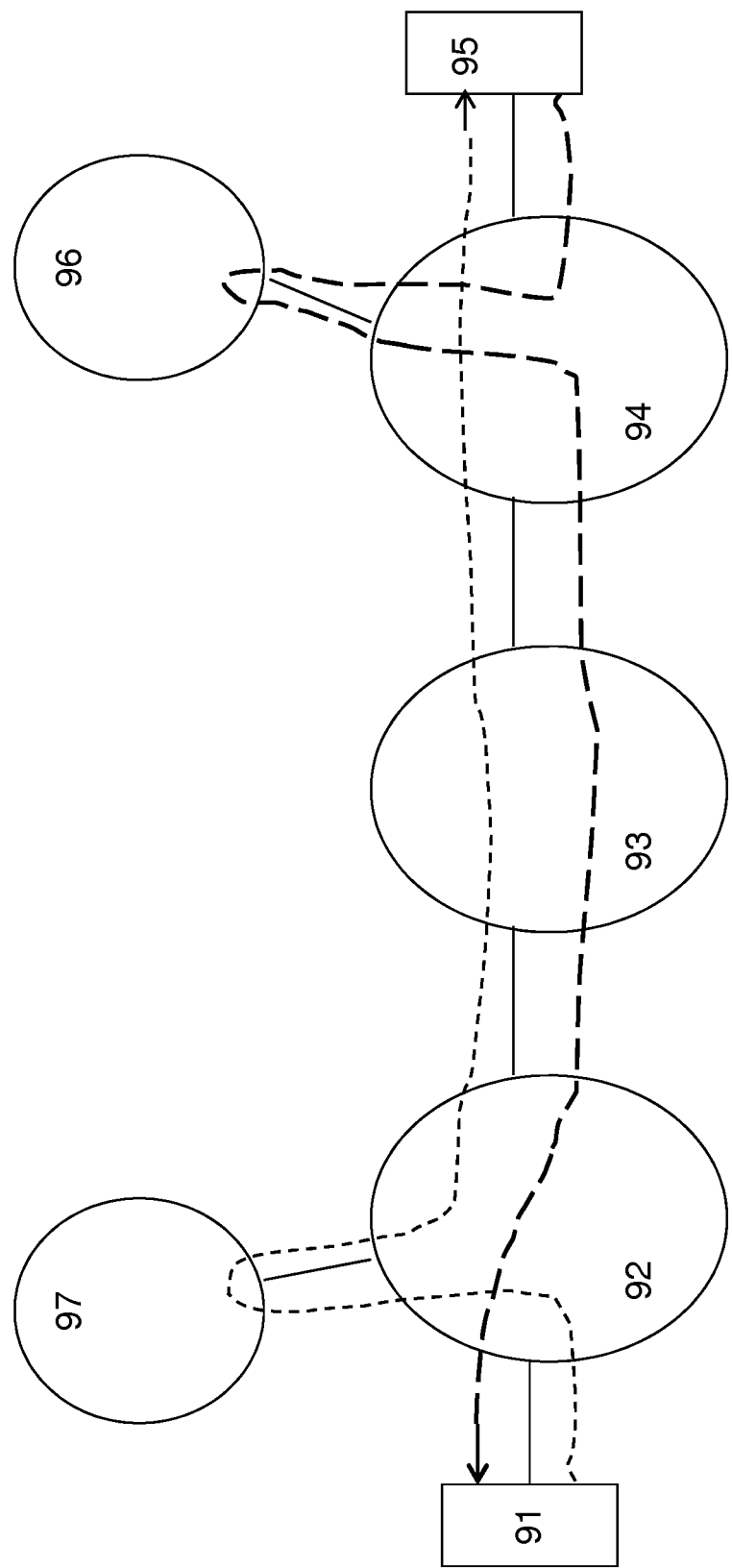
FIG. 9 shows a schematic diagram of a simplified network architecture according to exemplary embodiments of the present invention.

FIG. 9 shows a schematic diagram of a simplified network architecture according to exemplary embodiments of the present invention and in particular a generalized illustration for far end functions used for downlink service data flow(s).

According to the simplified network architecture shown in FIG. 9, exemplary embodiments can generally be applied to any kinds of networks, and can thus be seen as a generalization of the mechanisms described above.

In FIG. 9, there are two separate networks (network A 92 and network B 94), each serving a respective transmission endpoint TE (91, 95), possibly with an intermediate network (network C 93) between them. Both networks (A and B), or at least one of them, support service function chaining (service chain A 97, service chain B 96).

Networks A (92) and B (94) exchange control information to advertise the service functions they are willing to offer to be used for the traffic handling at the moment. The advertisement receiving network may respond with an indication about service functions it wants to be applied to given/indicated service data flows (SDFs) at the far end.

The control information may be piggybacked within user data packets or may use dedicated packets. The basic mechanism/protocol can be based e.g. on a service header. But in this case the header/parameters may be transferred between networks and/or service chains rather than service chain internally.

According to exemplary embodiments of the present invention, in order to work properly, the inter-network mechanism may need an agreement between the operators of the involved networks (e.g. networks A (92) and B (94)). The network wanting to advertise its service function chain shall obviously know whether the target network/domain supports the service chain advertisement. Otherwise advertisements may be sent to a network/domain that cannot understand them and cannot remove them from piggybacked packets.

According to further embodiments of the present invention, the advertising and response may thus be transmitted on the signaling plane, inserted by a sending network entity/function and extracted or read by a receiving network entity/function. The signaling and/or used information elements may be defined so that a receiver not understanding the signaling element(s) may just ignore them. So a prior agreement on supporting the advertising of service chain functions between the network operators may not be needed.

According to still further embodiments of the present invention, the advertising and response may thus be transmitted within application level signaling in the traffic channel, inserted by a sending network entity/function and extracted or read by a receiving network entity/function. The signaling and/or used information elements may be defined so that a receiver not understanding the signaling element(s) may just ignore them. So a prior agreement on supporting the advertising of service chain functions between the network operators may not be needed.

On an implementation level, concerning the unlikely/rare case of proxy mobile internet protocol (PMIP) (i.e. PMIP is used instead of GTP between S-GW and P-GW), the signalling between S-GW and P-GW may take place either via visited network PCRF (V-PCRF) and home network PCRF (H-PCRF) (i.e. S-GW-V-PCRF-H-PCRF-P-GW) or on the IP level.

The home network needs basically just what is needed for service function chaining anyway plus a functionality (within the control of the chain) to maintain availability information about service functions.

The visited network needs control functionality for checking the offered services against the status of the visited network to decide on whether to use the offered service(s). MME is probably the most suitable entity to handle this.

In the general case networks A and B shall have a control functionality, which they already have, if they support service function chaining. So the minimum extra that is needed is the offer/answer mechanism between the control functions.

The basic use case is the service chaining in the 3GPP network as described with reference to the first and the second options according to exemplary embodiments of the present invention, on which the standardization is going on in 3GPP. However, the generalized mechanisms described above offers a general implementation applicable to different network and service offering configurations.

The above-described procedures and functions may be implemented by respective functional elements, processors, or the like, as described below.

In the foregoing exemplary description of the network entities/devices, only the units that are relevant for understanding the principles of the invention have been described using functional blocks. The network entities/devices may comprise further units that are necessary for its respective operation.

However, a description of these units is omitted in this specification. The arrangement of the functional blocks of the devices is not construed to limit the invention, and the functions may be performed by one block or further split into sub-blocks.

When in the foregoing description it is stated that the entity/device (or some other means) is configured to perform some function, this is to be construed to be equivalent to a description stating that a (i.e. at least one) processor or corresponding circuitry, potentially in cooperation with computer program code stored in the memory of the respective entity/device, is configured to cause the entity/device to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 10:
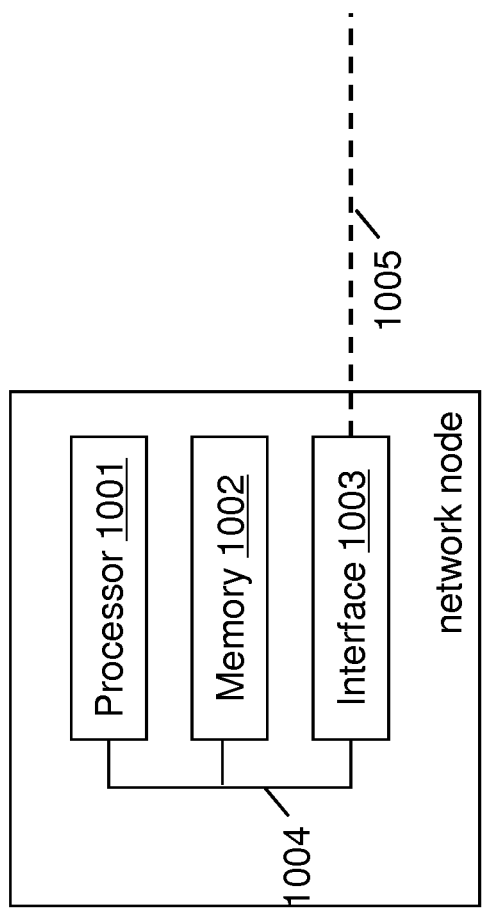
FIG. 10 is a block diagram alternatively illustrating apparatuses/devices according to exemplary embodiments of the present invention.

In FIG. 10, an alternative illustration of apparatuses/devices/entities according to exemplary embodiments of the present invention is depicted. As indicated in FIG. 10, according to exemplary embodiments of the present invention, the apparatus/device/entity as part of a system described above comprises a processor 1001, a memory 1002 and an interface 1003, which are connected by a bus 1004 or the like and the apparatus/device/entity may be connected via link 1005.

The processor 1001 and/or the interface 1003 may also include a modem or the like to facilitate communication over a (hardwire or wireless) link, respectively. The interface 1003 may include a suitable transceiver coupled to one or more antennas or communication means for (hardwire or wireless) communications with the linked or connected device(s), respectively. The interface 1003 is generally configured to communicate with at least one other apparatus/device/entity, i.e. the interface thereof.

The memory 1002 may store respective programs assumed to include program instructions or computer program code that, when executed by the respective processor, enables the respective electronic device or apparatus to operate in accordance with the exemplary embodiments of the present invention.

In general terms, the respective devices/apparatuses/entities (and/or parts thereof) may represent means for performing respective operations and/or exhibiting respective functionalities, and/or the respective devices (and/or parts thereof) may have functions for performing respective operations and/or exhibiting respective functionalities.

When in the description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

For further details regarding the operability/functionality of the individual apparatuses/devices/entities, reference is made to the above description in connection with any one of FIGS. 1 to 9, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for service function chain interworking. Such measures exemplarily comprise recognizing, that said terminal is roaming in said visited network, detecting, that said visited network supports utilizing service functions of said service chaining, and applying, at a control function entity controlling said service function chaining, a service function of said service function chaining to a service data flow of said terminal, said service function being determined based on information on said roaming of said terminal in said visited network.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP 3$^{rd}$ Generation Partnership Project
ADC application detection and control
CP control plane
DPI deep packet inspection
FMSS flexible mobile service steering
GPRS General Packet Radio Service
GTP GPRS tunneling protocol
H-PCRF home network PCRF
IP internet protocol
IP-CAN internet protocol connectivity access network
MME mobility management entity
NAT network address translation
PCRF policy and charging rules function
P-GW packet data network gateway, PDN-GW
PMIP proxy mobile internet protocol
QoS quality of service
SDF service data flow
S-GW serving gateway
UE user equipment
UP user plane
V-PCRF visited network PCRF

The invention claimed is:

1. A control method, in a home network of a terminal roamed in a visited network connected to said home network, of controlling service function chaining of said home network, the method comprising:
    establishing or modifying a bearer for an internet protocol connectivity access network session based on a trigger originating from the terminal,
    sending a request for authorization and policy and charging control rules,
    recognizing, from the request, that said terminal is roaming in said visited network,
    detecting, that said visited network supports utilizing service functions of said service chaining, and
    applying, at a control function entity controlling said service function chaining, a service function of said service function chaining to a service data flow of said terminal, said service function being determined based on information on said roaming of said terminal in said visited network, wherein the information on the roaming of the terminal in the visited network is at least one of policy information for the terminal, network status information of the visited network, and status information of the terminal, and wherein the policy information is negotiated and agreed upon.

2. The control method according to claim 1, further comprising
    deciding, based on a result of said recognizing and said detecting, that service function chaining information is to be requested for said service data flow from said control function entity, and
    requesting, for said service data flow, from said control function entity, said service function chaining information.

3. The control method according to claim 2, further comprising
    receiving, at said control function entity, said requesting for said service function chaining information for said service data flow,
    deciding, at said control function entity, a selection of service functions of said service function chaining to be advertised based on said service data flow, and transmitting, to said visited network, said selection of service functions of said service function chaining to be advertised.

4. The control method according to claim 3, further comprising
receiving, from said visited network, a request indicative of a demand of utilization of said service function for said service data flow, wherein
said service function being determined on a visited network side.

5. The control method according to claim 2, further comprising
receiving, at said control function entity, said requesting for said service function chaining information for said service data flow, and
transmitting, to said visited network, an indication that reception of said information on said roaming of said terminal in said visited network is accepted.

6. The control method according to claim 5, further comprising
receiving, from said visited network, said information on said roaming of said terminal in said visited network, and
determining, at said control function entity, said service function based on said information on said roaming of said terminal in said visited network.

7. A computer program product embodied on a non-transitory computer-readable medium, said product comprising computer-executable computer program code which, when the program is run on a computer, is configured to cause the computer to carry out the method according to claim 1.

8. A utilizing method, in a visited network roaming a terminal of a home network connected to said visited network, of utilizing for said terminal a service function of service function chaining of said home network, the method comprising:
receiving, from said home network, information related to said service function chaining,
checking the information related to the service function chaining against a status of the visited network, and
transmitting, to said home network as a result of the checking, information related to an intended utilization of said service function for a service data flow of said terminal, said service function being determined based on information on said roaming of said terminal in said visited network, wherein the information on the roaming of the terminal in the visited network is at least one of policy information for the terminal, network status information of the visited network, and status information of the terminal, and wherein the policy information is negotiated and agreed upon.

9. The utilizing method according to claim 8, further comprising
receiving, from said home network, a selection of service functions of said service function chaining,
determining said service function out of said selection of service functions for said service data flow, and
transmitting, to said home network, a request indicative of a demand of utilization of said service function for said service data flow.

10. The utilizing method according to claim 8, further comprising
receiving, from said home network, an indication that reception of said information on said roaming of said terminal in said visited network is accepted, and
transmitting, to said home network, said information on said roaming of said terminal in said visited network, wherein
said service function being determined on a home network side.

11. A control system, in a home network of a terminal roamed in a visited network connected to said home network, for controlling service function chaining of said home network, the control system comprising:
a gateway device configured to establish or modify a bearer for an internet protocol connectivity access network session based on a trigger originating from the terminal, and configured to send a request for authorization and policy and charging control rules,
a control function entity configured to control said service function chaining,
a recognizing device connected to said control function entity and configured to recognize, from the request, that said terminal is roaming in said visited network, and
a detecting device connected to said control function entity and configured to detect, that said visited network supports utilizing service functions of said service chaining, wherein
said control function entity comprises a applying device configured to apply a service function of said service function chaining to a service data flow of said terminal, said service function being determined based on information on said roaming of said terminal in said visited network, wherein the information on the roaming of the terminal in the visited network is at least one of policy information for the terminal, network status information of the visited network, and status information of the terminal, and wherein the policy information is negotiated and agreed upon.

12. The control system according to claim 11, wherein
said control function entity comprises a deciding device configured to decide, based on a result of said recognizing device and said detecting device, that service function chaining information is to be requested for said service data flow from said control function entity, and
said control system further comprising
a requesting device connected to said control function entity and configured to request, for said service data flow said service function chaining information.

13. The control system according to claim 12, wherein
said control function entity comprises a receiving device configured to receive said requesting for said service function chaining information for said service data flow, wherein
said deciding device is configured to decide a selection of service functions of said service function chaining to be advertised based on said service data flow, and said control system further comprises
a transmitting device configured to transmit, to said visited network, said selection of service functions of said service function chaining to be advertised.

14. The control system according to claim 13, wherein
said receiving device is configured to receive, from said visited network, a request indicative of a demand of utilization of said service function for said service data flow, and
said service function being determined on a visited network side.

15. The control system according to claim 12, wherein
said control function entity further comprises a receiving device configured to receive said requesting for said service function chaining information for said service data flow, and said control system further comprises
a transmitting device configured to transmit, to said visited network, an indication that reception of said information on said roaming of said terminal in said visited network is accepted.

16. The control system according to claim 15, wherein
said receiving device is configured to receive, from said visited network, said information on said roaming of said terminal in said visited network, and
said control function entity comprises a determining device configured to determine said service function based on said information on said roaming of said terminal in said visited network.

17. The control system according to claim 11, wherein
the control system is operable as or at, at least one network node of a cellular system on a home network side, or
the control system is operable in at least one of a LTE and a LTE-A cellular system.

18. A utilizing system, in a visited network roaming a terminal of a home network connected to said visited network, for utilizing for said terminal a service function of service function chaining of said home network, the utilizing system comprising:
a receiving device configured to receive, from said home network, information related to said service function chaining, and
a transmitting device connected to said receiving device and configured to transmit, to said home network, information related to an intended utilization of said service function for a service data flow of said terminal, said service function being determined based on information on said roaming of said terminal in said visited network, wherein the information on the roaming of the terminal in the visited network is at least one of policy information for the terminal, network status information of the visited network, and status information of the terminal, and wherein the policy information is negotiated and agreed upon,
wherein the transmitting device is further configured to check the information related to the service function chaining against a status of the visited network.

19. The utilizing system according to claim 18, wherein
said receiving device is further configured to receive, from said home network, a selection of service functions of said service function chaining, and said utilizing system further comprises
a determining device connected to said receiving device and said transmitting device and configured to determine said service function out of said selection of service functions for said service data flow, and wherein
said transmitting device is configured to transmit, to said home network, a request indicative of a demand of utilization of said service function for said service data flow.

20. The utilizing system according to claim 18, wherein
said receiving device is further configured to receive, from said home network, an indication that reception of said information on said roaming of said terminal in said visited network is accepted, and
said transmitting device is configured to transmit, to said home network, said information on said roaming of said terminal in said visited network, wherein
said service function being determined on a home network side.

21. The utilizing system according to claim 18, wherein
the utilizing system is operable as or at, at least one network node of a cellular system on a visited network side, or
the utilizing system is operable in at least one of a LTE and a LTE-A cellular system.

* * * * *